US011385056B2

(12) United States Patent
Min

(10) Patent No.: US 11,385,056 B2
(45) Date of Patent: Jul. 12, 2022

(54) DEVICE AND METHOD FOR DETECTING LIQUID LEAK INTO BATTERY PACK BY USING GYRO SENSOR AND MOISTURE DETECTION SENSOR

(71) Applicant: LG Chem, Ltd., Seoul (KR)

(72) Inventor: Kyoung Choon Min, Daejeon (KR)

(73) Assignee: LG Energy Solution, Ltd.

( * ) Notice: Subject to any disclaimer, the term of this patent is extended or adjusted under 35 U.S.C. 154(b) by 429 days.

(21) Appl. No.: 16/496,732

(22) PCT Filed: Aug. 9, 2018

(86) PCT No.: PCT/KR2018/009071
§ 371 (c)(1),
(2) Date: Sep. 23, 2019

(87) PCT Pub. No.: WO2019/035599
PCT Pub. Date: Feb. 21, 2019

(65) Prior Publication Data
US 2020/0292404 A1        Sep. 17, 2020

(30) Foreign Application Priority Data

Aug. 18, 2017  (KR) .................. 10-2017-0104788

(51) Int. Cl.
*G01C 19/00*  (2013.01)
*H01M 10/625*  (2014.01)
(Continued)

(52) U.S. Cl.
CPC ............. *G01C 19/00* (2013.01); *G01M 3/186* (2013.01); *G01N 25/58* (2013.01);
(Continued)

(58) Field of Classification Search
None
See application file for complete search history.

(56) References Cited

U.S. PATENT DOCUMENTS 8,615,372 B2    12/2013    Tomura et al.
9,217,779 B2    12/2015    Xu et al.
(Continued)

FOREIGN PATENT DOCUMENTS

JP      2002343074 A    11/2002
JP      2008096140 A     4/2008
(Continued)

OTHER PUBLICATIONS

International Search Report dated Jan. 2, 2019, in PCT/KR2018/009071 (2 pages).

*Primary Examiner* — Eli S Mekhlin
(74) *Attorney, Agent, or Firm* — Lerner, David, Littenberg, Krumholz & Mentlik, LLP

(57) ABSTRACT

An apparatus and a method of detecting liquid leakage within a battery pack using a gyro sensor and a moisture detecting sensor. When liquid leakage of a coolant is detected, such as when a pipe of a coolant supplied for cooling (radiating heat) within a battery pack is damaged, the apparatus recognizes a liquid leakage generation position according to a slope of the battery pack by using a gyro sensor and determines whether the liquid leakage is generated based on a difference in a temperature between an upper side and a lower side of a corresponding region by using moisture detecting sensors, thereby improving accuracy of the detection of the liquid leakage according to the slope and the position of the battery pack. Particularly, the moisture detecting sensor is operated to be on only when the detection of the liquid leakage is required, thereby preventing unnecessary energy consumption.

15 Claims, 3 Drawing Sheets

(51) Int. Cl.
   *H01M 10/6567*   (2014.01)
   *G01N 25/58*     (2006.01)
   *G01M 3/18*      (2006.01)
   *H01M 10/42*     (2006.01)

(52) U.S. Cl.
   CPC ..... *H01M 10/4228* (2013.01); *H01M 10/625* (2015.04); *H01M 10/6567* (2015.04); *H01M 2200/00* (2013.01); *H01M 2220/20* (2013.01)

(56) References Cited

U.S. PATENT DOCUMENTS

| | | | |
|---|---|---|---|
| 10,355,322 B2 | 7/2019 | Takatsuka et al. | |
| 2013/0143090 A1* | 6/2013 | Hosoya | H01M 10/0587 |
| | | | 429/94 |
| 2017/0144562 A1* | 5/2017 | Thomas | H01M 10/4257 |
| 2018/0048032 A1* | 2/2018 | Takatsuka | B60L 58/24 |

FOREIGN PATENT DOCUMENTS

| | | | |
|---|---|---|---|
| JP | 2010060384 A | 3/2010 |
| JP | 2013516614 A | 5/2013 |
| JP | 2014192124 A | 10/2014 |
| KR | 20120004129 A | 1/2012 |
| KR | 20130022145 A | 3/2013 |
| KR | 20140062622 A | 5/2014 |
| WO | 2016143399 A1 | 9/2016 |

* cited by examiner

DEVICE AND METHOD FOR DETECTING LIQUID LEAK INTO BATTERY PACK BY USING GYRO SENSOR AND MOISTURE DETECTION SENSOR

CROSS-REFERENCE TO RELATED APPLICATIONS

The present application is a national phase entry under 35 U.S.C. § 371 of International Application No. PCT/KR2018/009071 filed Aug. 9, 2018, published in Korean, which claims priority from Korean Patent Application No. 10-2017-0104788 filed in the Korean Intellectual Property Office on Aug. 18, 2017, all of which are incorporated herein by reference.

TECHNICAL FIELD

The present invention relates to an apparatus and a method of detecting liquid leakage within a battery pack by using a gyro sensor and a moisture detecting sensor, and more particularly, to an apparatus and a method of detecting liquid leakage within a battery pack by using a gyro sensor and a moisture detecting sensor, which, when liquid leakage of a coolant (which may occur when a pipe of the coolant supplied for cooling (radiating heat) within a battery pack is damaged) is detected, recognize a liquid leakage generation position according to a slope of the battery pack by using a gyro sensor and determine whether the liquid leakage is generated based on a difference in a temperature between an upper side and a lower side of a corresponding region by using moisture detecting sensors, thereby improving accuracy of the detection of the liquid leakage according to the slope and the position of the battery pack, and particularly, which operate the moisture detecting sensor to be on only for a region requiring the detection of the generation of the liquid leakage, thereby preventing unnecessary energy consumption.

BACKGROUND ART

Recently, in order to decrease use of an internal combustion engine and use eco-friendly electric energy, vehicles mounted with large-capacity batteries have been released.

The battery for a vehicle is formed of a plurality of battery packs inside thereof, and the battery pack is a heat radiating means for cooling the battery pack according to the emission of the large amount of heat, and currently, the battery pack induces a flow of a coolant through a coolant pipe to cool heat emitted from the battery pack.

In this case, when the coolant pipe is damaged, the coolant leaks into the battery pack, so that an electric short may be generated due to the coolant, but currently, there is not actually prepared a condition, in which it is possible to directly detect liquid leakage or a liquid leakage position of the coolant.

In this respect, in order to solve the problems according to liquid leakage of a coolant (which may occur in the battery pack) in the related art, the present inventors developed an apparatus and a method of detecting liquid leakage within a battery pack by using a gyro sensor and a moisture detecting sensor, which recognize a liquid leakage generation position according to a slope of a battery pack by using a gyro sensor and determine whether the liquid leakage is generated based on a difference in a temperature between an upper side and a lower side of a corresponding region by using moisture detecting sensors, thereby improving accuracy of the detection of the liquid leakage according to the slope and the position of the battery pack, and particularly, which operate the moisture detecting sensor to be on only for a region requiring the detection of the generation of the liquid leakage, thereby preventing unnecessary energy consumption.

DETAILED DESCRIPTION OF THE INVENTION

Technical Problem

The present invention is conceived to solve the problems, and provides an apparatus and a method of detecting liquid leakage within a battery pack by using a gyro sensor and a moisture detecting sensor, which recognize a liquid leakage generation position according to a slope of a battery pack by using a gyro sensor and determine whether the liquid leakage is generated based on a difference in a temperature between an upper side and a lower side of a corresponding region by using moisture detecting sensors, thereby improving accuracy of the detection of the liquid leakage according to the slope and the position of the battery pack, and particularly, which operate the moisture detecting sensor to be on only for a region requiring the detection of the generation of the liquid leakage, thereby preventing unnecessary energy consumption.

Technical Solution

An exemplary embodiment of the present invention provides an apparatus for detecting liquid leakage within a battery pack, the apparatus including: a slope sensor configured to detect a slope of a battery pack within a vehicle and to output a slope detection result value indicating the detected slope; a moisture sensor configured to detect moisture in each of an upper portion of the battery pack and a lower portion of the battery pack and to output a moisture detection result value indicating the detected moisture; and a liquid leakage determining unit configured to obtain the slope detection result value and the moisture detection result value from the slope sensor and the moisture sensor, respectively, and to determine liquid leakage of the battery pack based on the obtained slope detection result value and the obtained moisture detection result value.

In the exemplary embodiment, the slope sensor may be a gyro sensor configured to detect a slope and overturning of the battery pack.

In the exemplary embodiment, the moisture sensor is configured to detect moisture based on a temperature difference between the upper portion and the lower portion.

In the exemplary embodiment, when the battery pack is sloped to a side, the slope sensor may be configured to transmit a slope detection result value corresponding to the slope of the battery pack to the liquid leakage determining unit, and the liquid leakage determining unit may be configured to operate the moisture sensor in a direction corresponding to the slope detection result value to detect moisture in each of the upper portion and the lower portion.

In the exemplary embodiment, the apparatus may include a plurality of moisture sensors provided in the upper portion and the lower portion of the battery pack, respectively.

Another exemplary embodiment of the present invention provides a method of detecting liquid leakage within a battery pack, the method including: detecting a slope of a battery pack within a vehicle; detecting moisture in an upper portion and a lower portion within the battery pack; and obtaining a slope detection result value and a moisture detection result value from the detected slope of the battery pack and the detected moisture within the battery pack, respectively, and determining liquid leakage of the battery pack based on the slope detection result value and the moisture detection result value.

Advantageous Effect

According to one aspect of the present invention, when liquid leakage of a coolant (which may occur when a coolant supplied for cooling (radiating heat) within a battery pack is damaged) is detected, it is possible to recognize a liquid leakage generation position according to a slope of the battery pack by using a gyro sensor and determine whether the liquid leakage is generated based on a difference in a temperature between an upper side and a lower side of a corresponding region by using moisture detecting sensors, thereby improving accuracy of the detection of the liquid leakage according to the slope and the position of the battery pack, and particularly, it is possible to operate the moisture detecting sensor to be on only for a region requiring the detection of the generation of the liquid leakage, thereby preventing unnecessary energy consumption.

DETAILED DESCRIPTION

Hereinafter, an exemplary embodiment is presented for helping understanding of the present invention. However, the exemplary embodiment below is simply provided for easier understanding of the present invention, and the contents of the present invention are not limited by the exemplary embodiment.

Figure 1:
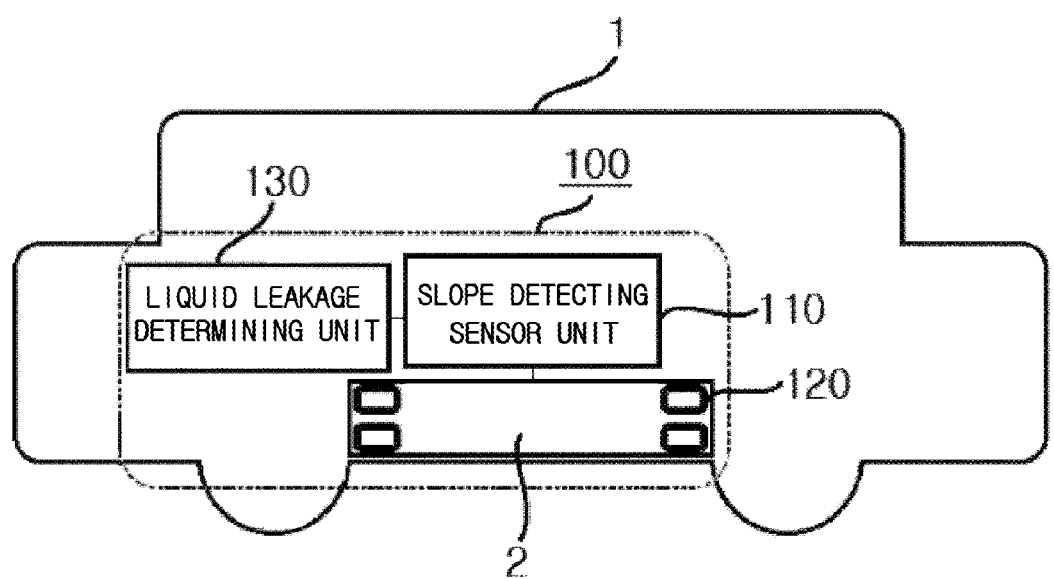
FIG. 1 is a diagram schematically illustrating a configuration of an apparatus 100 for detecting liquid leakage within a battery pack by using a gyro sensor and a moisture detecting sensor according to an exemplary embodiment of the present invention.
Figure 2:
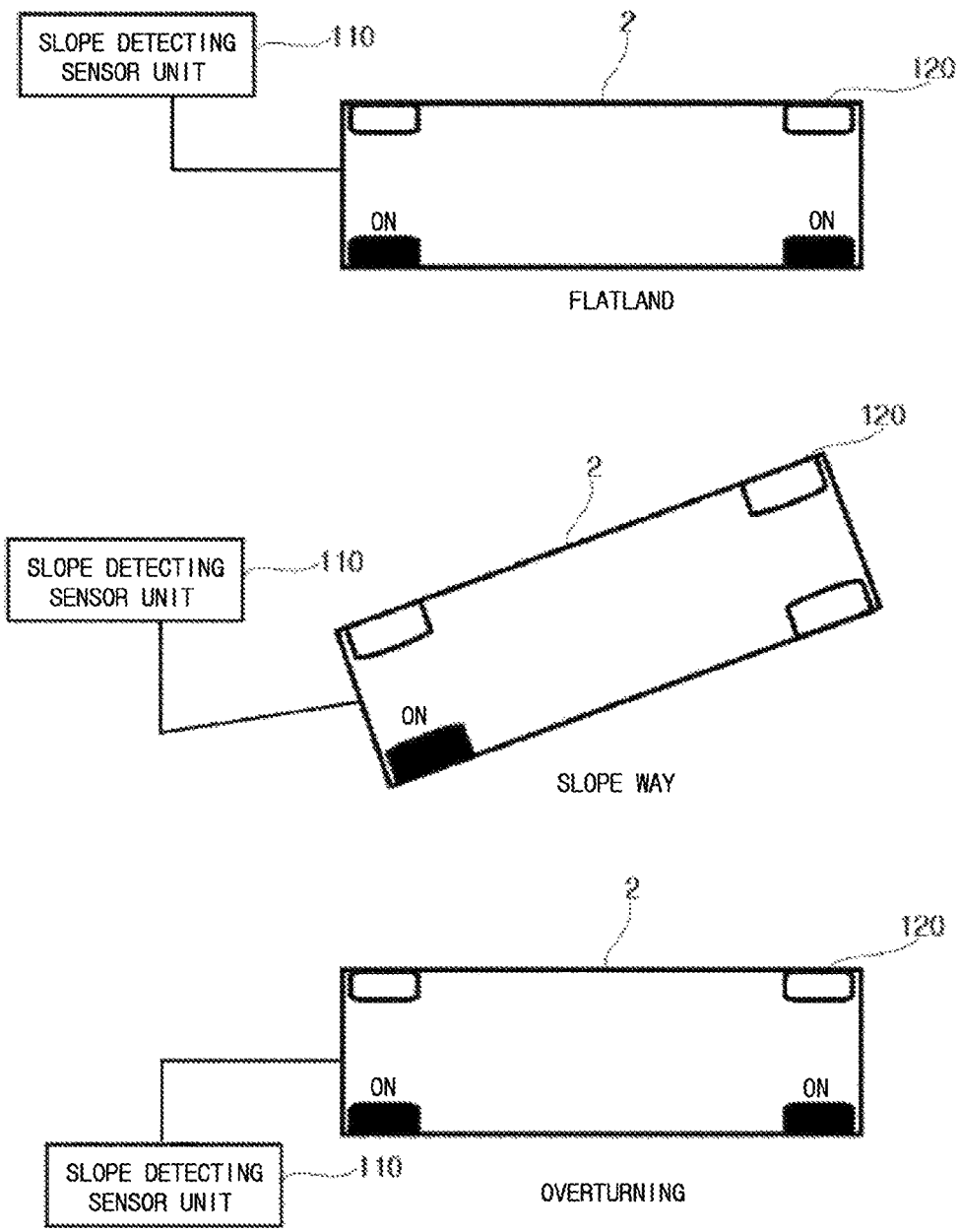
FIG. 2 is a diagram illustrating a process of detecting liquid leakage according to each state of a battery pack 2 by using the apparatus 100 for detecting liquid leakage within a battery pack by using a gyro sensor and a moisture detecting sensor illustrated in FIG. 1.

FIG. 1 is a diagram schematically illustrating a configuration of an apparatus 100 for detecting liquid leakage within a battery pack by using a gyro sensor and a moisture detecting sensor according to an exemplary embodiment of the present invention, and FIG. 2 is a diagram illustrating a process of detecting liquid leakage according to each state of a battery pack 2 by using the apparatus 100 for detecting liquid leakage within a battery pack by using a gyro sensor and a moisture detecting sensor illustrated in FIG. 1.

Referring to FIGS. 1 and 2, the apparatus 100 for detecting liquid leakage within a battery pack by using a gyro sensor and a moisture detecting sensor according to the exemplary embodiment of the present invention may generally include a slope detecting sensor unit 110, a moisture detecting sensor unit 120, and a liquid leakage determining unit 130.

First, the slope detecting sensor unit 110 may serve to detect a slope of a battery pack 2 within a vehicle 1, and for example, serve to detect a slope and overturning with respect to each direction of the battery pack 2.

Referring to FIG. 2, when the vehicle 1 is sloped, the battery pack 2 is also sloped or overturned together, and the slope detecting sensor unit 110 is provided with a gyro sensor detecting a slope and overturning, so that the slope detecting sensor unit 110 may serve to determine that the battery pack 2 is positioned in a flatland state, the battery pack 2 is positioned in an sloped state, the battery pack 2 is in an overturned state together according to the overturning of the vehicle, or the like.

The slope detecting sensor unit 110 provides a detection result value of the detected slope to the liquid leakage determining unit 130, which is to be described below, thereby enabling only the moisture detecting sensor unit 120, which is positioned in a corresponding slope direction, to be operated on through the liquid leakage determining unit 130.

For example, when the vehicle 1 is sloped 45° to the left, the slope detecting sensor unit 110 may provide a slope detection result value indicating that the vehicle 1 and the battery pack 2 are currently sloped 45° to the left to the liquid leakage determining unit 130, which is to be described below, and the liquid leakage determining unit 130 may make only the moisture detecting sensor unit 120, which is positioned at the left side of the battery pack 2, be operated on.

Next, the moisture detecting sensor unit 120 may serve to detect moisture within the battery pack 2, and particularly, the plurality of moisture detecting sensor units 120 is provided in an upper portion and a lower portion within the battery pack 2, so that when the battery pack 2 is positioned in a flatland state, is sloped in any direction, or is overturned upside down, the moisture detecting sensor unit 120 may detect moisture according to liquid leakage in a region, such as a lower portion, a left side, a right side, and an upper side of the battery pack 2, related to the slope.

More particularly, the moisture detecting sensor units 120 are provided in the upper portion and the lower portion within the battery pack 2, respectively, and determine a difference in a temperature between the upper portion and the lower portion within the battery pack 2, and for example, when liquid leakage is generated in the lower portion within the battery pack 2, a temperature is different between the moisture detecting sensor unit 120 positioned in the corresponding region and the moisture detecting sensor unit 120 positioned in the upper portion, and the moisture detecting sensor units 120 provides moisture detection result values for the difference in the temperature to the liquid leakage determining unit 130, which is to be described below, so that it is possible to determine that liquid leakage is currently generated in the lower portion within the battery pack 2 through the liquid leakage determining unit 130.

Referring to FIG. 2, when the vehicle 1 is positioned on a flat land and the battery pack 2 maintains a flat state, the moisture detecting sensor unit 120 positioned in the lower portion among the plurality of moisture detecting sensor units 120 positioned within the battery pack 2 is operated on and determines a difference in a temperature between the upper portion and the lower portion of the battery pack 2, and when the vehicle 2 is positioned on a slope way and the battery pack 2 is positioned in one side direction (for example, a direction of 45° to the left side or a direction of 45° to the rear side), the moisture detecting sensor unit 120 positioned in the lower portion of the left side or the rear side among the plurality of moisture detecting sensor units 120 positioned within the battery pack 2 is operated on and provides a moisture detection result value for a difference in a temperature between the upper portion and the lower portion for the region, in which the battery pack 2 is sloped, to the liquid leakage determining unit 130, which is to be described below, so that it is possible to determine that the liquid leakage is currently generated in the region, in which the battery pack 2 is sloped, through the liquid leakage determining unit 130.

This feature corresponds to the configuration for operating the moisture detecting sensor unit 120 only for the situation where it is necessary to detect moisture in a portion, in which liquid leakage is generated, which prevents an unnecessary operation of the moisture detecting sensor unit 120, thereby preventing unnecessary power consumption.

Next, the liquid leakage determining unit 130 may be a processor, microprocessor, or other computing device, configured to obtain the slope detection result value from the slope detecting sensor unit 110, obtain the moisture detection result value from the moisture detecting sensor unit 120, and then determine whether liquid leakage is generated for each situation (for example, the sloped state of the battery pack 2) of the battery pack 2 based on the obtained slope detection result value and the obtained moisture detection result value.

For example, when the vehicle 1 and the battery pack 2 are sloped at 45° to the left or the rear side, the liquid leakage determining unit 130 makes only the lower-side moisture detecting sensor unit 120 positioned in the corresponding region be operated on and detects and determines whether liquid leakage is generated in the corresponding region based on a slope detection result value for the sloped state, and when the vehicle 1 and the battery pack 2 are sloped at 45° to the right or the front side, the liquid leakage determining unit 130 makes only the lower-side moisture detecting sensor unit 120 positioned in the corresponding region be operated on and detects and determines whether liquid leakage is generated in the corresponding region based on a slope detection result value for the sloped state.

Next, a process of detecting liquid leakage of the battery pack 2 by using the apparatus 100 for detecting liquid leakage within a battery pack by using a gyro sensor and a moisture detecting sensor will be described with reference to FIG. 3.

Figure 3:
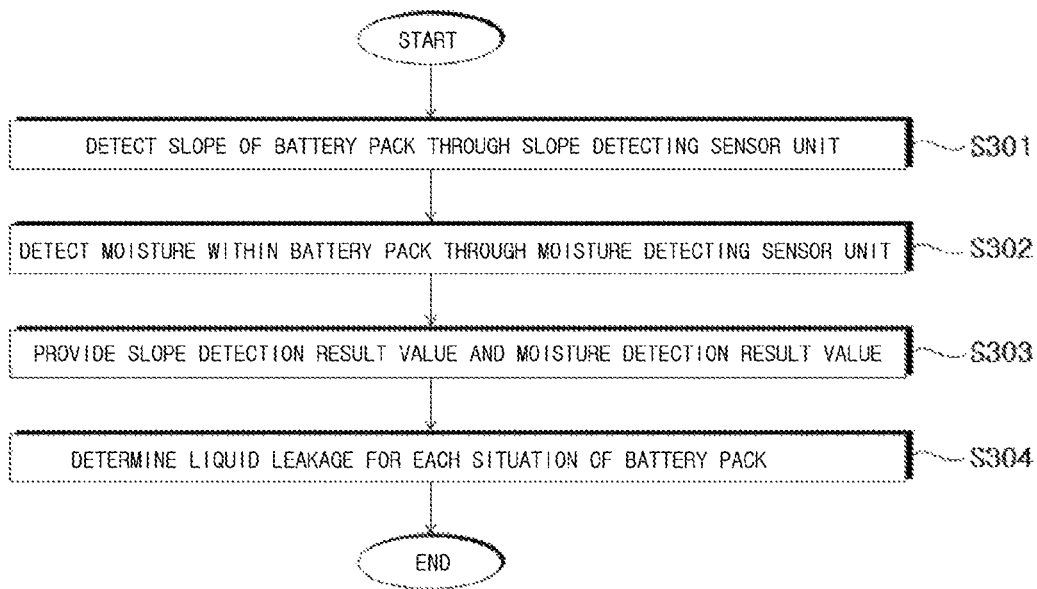
FIG. 3 is a diagram sequentially illustrating a series of processes of detecting liquid leakage of the battery pack 2 by using the apparatus 100 for detecting liquid leakage within a battery pack by using a gyro sensor and a moisture detecting sensor illustrated in FIG. 1.

FIG. 3 is a diagram sequentially illustrating a series of processes of detecting liquid leakage of the battery pack 2 by using the apparatus 100 for detecting liquid leakage within a battery pack by using a gyro sensor and a moisture detecting sensor illustrated in FIG. 1.

Referring to FIG. 3, first, a slope of the battery pack 2 within the vehicle is detected through the slope detecting sensor unit 110 (S301), and moisture within the battery pack 2 is detected through the moisture detecting sensor unit 120 (S302).

A slope detection result value according to operation S301 and a moisture detection result value according to operation S302 are provided to the liquid leakage determining unit 130 (S303), and the liquid leakage determining unit 130 determines liquid leakage for each situation of the battery pack 2 based on the slope detection result value and the moisture detection result value (S304).

In the forgoing, the present invention has been described with reference to the exemplary embodiment of the present invention, but those skilled in the art may appreciate that the present invention may be variously corrected and changed within the range without departing from the spirit and the area of the present invention described in the appending claims.

The invention claimed is:

1. An apparatus for detecting liquid leakage within a battery pack, the apparatus comprising:
    a slope sensor configured to detect a slope of a battery pack within a vehicle and to output a slope detection result value indicating the detected slope;
    a plurality of moisture sensors configured to detect moisture in different locations of the battery pack, including each of an upper portion of the battery pack and a lower portion of the battery pack, each moisture sensor configured to output a moisture detection result value indicating the detected moisture in its respective location of the battery pack; and
    a liquid leakage determining unit configured to:
        obtain the slope detection result value from the slope sensor;
        select one or more of the plurality of moisture sensors based on the obtained slope detection result value; and
        determine liquid leakage of the battery pack based on the obtained moisture detection result value of the selected moisture sensors.

2. The apparatus of claim 1, wherein the slope sensor is a gyro sensor configured to detect a slope and overturning of the battery pack.

3. The apparatus of claim 1, wherein the plurality of moisture sensors are configured to detect moisture based on a temperature difference between the upper portion and the lower portion.

4. The apparatus of claim 1, wherein when the battery pack is sloped to a side, the slope sensor is configured to transmit a slope detection result value corresponding to the slope of the battery pack to the liquid leakage determining unit, and the liquid leakage determining unit is configured to select one or more of the moisture sensors in a direction corresponding to the slope detection result value to detect the moisture in each of the upper portion and the lower portion.

5. The apparatus of claim 1, wherein, at least one of plurality of moisture sensors is not included in the selected moisture sensors.

6. The apparatus of claim 1, wherein the liquid leakage determining unit is configured to, in response to the obtained slope detection result value indicating that the vehicle is sloped to a side, select only the one or more moisture sensors positioned on said side of the battery pack.

7. The apparatus of claim 1, wherein the liquid leakage determining unit is configured to, in response to the obtained slope detection result value indicating that the vehicle is overturned, select one or more moisture sensors positioned in the upper portion of the battery pack.

8. A method of detecting liquid leakage within a battery pack within a vehicle, the method comprising:
    obtaining, by a liquid leakage determining unit, a slope detection result value indicating a detected slope of the battery pack;
    selecting, by the liquid leakage determining unit, one or more of a plurality of moisture sensors configured to detect moisture in different locations of the battery pack, including each of an upper portion of the battery pack and a lower portion of the battery pack, based on the obtained slope detection result value;

determining, by the liquid leakage determining unit, liquid leakage of the battery pack based on a moisture detection result value obtained from the selected moisture sensors.

9. The method of claim 8, wherein detecting the slope of the battery pack is performed by a gyro sensor.

10. The method of claim 8, wherein detecting moisture within the battery pack is based on a temperature difference between the upper portion and the lower portion.

11. The method of claim 8, wherein detecting moisture within the battery is performed by a plurality of moisture sensors positioned in the upper portion and the lower portion, respectively, and wherein when the battery pack is sloped to a side, detecting moisture within the battery is performed by the plurality of moisture sensors, and wherein the plurality of moisture sensors are positioned in a direction corresponding to the slope detection result value.

12. The method of claim 8, wherein detecting moisture within the battery is performed by a plurality of moisture detecting sensor units provided in the upper portion and the lower portion within the battery pack, respectively.

13. The method of claim 8, wherein, at least one of plurality of moisture sensors is not included in the selected moisture sensors.

14. The method of claim 8, wherein selecting the one or more moisture sensors comprises selecting, in response to the obtained slope detection result value indicating that the vehicle is sloped to a side, only the one or more moisture sensors positioned on said side of the battery pack.

15. The method of claim 8, wherein selecting the one or more moisture sensors comprises selecting, in response to the obtained slope detection result value indicating that the vehicle is overturned, one or more moisture sensors positioned in the upper portion of the battery pack.

* * * * *